United States Patent [19]

Shafer

[11] 4,009,263

[45] Feb. 22, 1977

[54] ENERGIZED COBALT-CONTAINING ANIMAL FEED

[76] Inventor: LaVerne Shafer, R.F.D., Cleghorn, Iowa 51041

[22] Filed: Feb. 15, 1974

[21] Appl. No.: 442,854

[52] U.S. Cl. .................................. 424/131; 426/2; 426/71; 426/658; 426/807; 423/151; 127/29; 424/180

[51] Int. Cl.$^2$ ........................................ A61K 33/24

[58] Field of Search .......... 426/210, 220, 271, 381, 426/374, 71, 74, 807, 237, 658, 807; 424/131, 295; 127/29; 423/151, 152, 594; 148/103, 108

[56] References Cited

UNITED STATES PATENTS

| 2,295,643 | 9/1942 | Emery | 426/74 |
|---|---|---|---|
| 2,659,698 | 11/1953 | Berge | 423/594 |
| 2,689,794 | 9/1954 | Jackson | 426/220 |
| 2,895,830 | 7/1959 | Roe | 426/74 |
| 3,198,635 | 8/1965 | Anderson | 426/271 |

FOREIGN PATENTS OR APPLICATIONS

| 712,109 | 6/1965 | Canada | 426/74 |
|---|---|---|---|
| 624,812 | 8/1961 | Canada | 426/74 |
| 2,001,947 | 1970 | Germany | 426/807 |

OTHER PUBLICATIONS

Feeds and Feeding, Morrison, 22nd Ed., Mormin Pub. Co. 1957, p. 112.
Journal of the American Chemical Society, vol. 75, pp. 1751, 1752, 1953, Rodgers.
Chem. Abs. vol. 79, 1973, 40581c, Mints.

Primary Examiner—Hiram H. Bernstein
Attorney, Agent, or Firm—Clarence A. O'Brien; Harvey B. Jacobson

[57] ABSTRACT

An animal feed supplement containing cobalt in polarized form enhances the efficient utilization of protein by ruminant animals and promotes their growth. In a preferred form, the supplement consists essentially of the reaction product of cobalt carbonate and lactic acid admixed with a diatomaceous earth and a sacchariferous substance.

33 Claims, No Drawings

ENERGIZED COBALT-CONTAINING ANIMAL FEED

The present invention relates to an animal feed supplement and, more particularly, to a supplement which includes an improved form of cobalt.

It is common practice today to feed animals supplemental foodstuffs which have been fortified with nutritive elements. Cobalt, in small amounts, is one of the nutrients which is essential to the health and growth of ruminants. The main function of cobalt is in the synthesis of vitamin $B_{12}$ (cobalamin). Since higher plants do not contain vitamin $B_{12}$, it must be synthesized in the digestive tract of ruminants, making it necessary to provide cobalt in the diet. Cobalt is an essential part of the vitamin $B_{12}$ molecule, and, therefore, if is is deficient in the ration, the micro-organisms in the ruminant are unable to synthesize vitamin $B_{12}$ in sufficient quantities to supply the needs of the host ruminant. Insufficient vitamin $B_{12}$ in the rumen inhibits protein conversion, retards growth and ultimately interferes with meat and milk production.

It is therefore an object of this invention to provide a cobalt-containing feed supplement which furnishes an improved form of cobalt to the rumen.

It is another object of the invention to provide a cobalt-containing feed supplement which includes cobalt in a form which improves protein conversion in the rumen and thereby promotes ruminant growth.

It is still another object to provide a method for preparing the improved cobalt-containing feed supplement of the present invention.

Other objects and advantages will become apparent from the following description and appended claims.

The foregoing objects can be accomplished in accordance with the present invention by incorporating as the cobalt component of an animal feed supplement, which may contain other nutrients as well, cobalt in polarized form. It has been found that when ruminants are fed feed rations, such as conventional liquid or solid feeds, including non-protein nitrogen feeds, which contain cobalt in polarized form, their growth rate is substantially increased. It is believed that this increase is attributable to more efficient conversion of protein as a direct result of improved and increased vitamin $B_{12}$ synthesis in the rumen.

Cobalt polarization is most readily achieved by electro-magnetic techniques. For example, the cobalt to be incorporated in the feed supplement, which may be in the form of cobalt carbonate, cobalt lactate, cobalt sulfate, cobalt oxide, cobalt hydroxide, or other cobalt compounds conventionally suitable for feed supplements, is passed through an electronic coil or helix surrounding an appropriate receptacle containing the cobalt or through which the cobalt is made to pass. The receptacle should be formed of a material which does not interfere with the establishment of the magnetic field and with the polarizing process, e.g. stainless steel or plastic. The magnetic field established by passing a direct current through the coil, having a strength of at least about 2270 amp. turns, energizes or excites the cobalt electrons and polarizes the atom.

In the preferred form of the invention, the polarized cobalt is incorporated within a feed supplement as cobalt lactate. The lactate is desirable because it has a relatively weak affinity for the cobalt and readily releases the cobalt within the rumen. Cobalt lactate may be conveniently prepared by reacting polarized cobalt carbonate with lactic acid (alpha-hydroxypropionic acid) in a stainless steel mixing vat. The reaction is preferably carried out by gradually adding cobalt carbonate to the lactic acid with constant stirring until the reaction is completed. One part by weight cobalt carbonate to six parts by weight lactic acid appears to be the optimum reactant ratio in terms of preparing a product which contains a desirable proportion of polarized cobalt for subsequent use as a feed supplement, as will be more fully discussed hereinafter. It will be appreciated, however, that reactant ratios of polarized cobalt carbonate to lactic acid in the range 1:4 to 1:8 are satisfactory, the primary difference in result residing in the viscosity of the reaction products. Thus, a 1:4 ratio would produce a product having a relatively thick consistency while a 1:8 ratio would produce a product having a somewhat thinner consistency. Reaction temperature should be controlled in the range 75°–98° F. to control the speed of reaction. The preferred range is 80°–95° F. since below 75° F. the reaction proceeds too slowly to have practical value while above 98° F. the reaction is very rapid and there is danger of crystallization.

If the feed supplement is a dry product, the cobalt lactate may be dried by employing an absorbent material to absorb any free lactic acid, most free moisture having been dissipated during the reaction. The absorbent material should be an inert substance suitable for incorporation into animal feed, but need lend no nutritional value to the feed. The absorbent also acts as a carrier and may be omitted if the feed to be supplemented is liquid. The preferred absorbents are diatomaceous earth materials although micaceous absorbents, such as commercially, available Verexite, have been found quite suitable. The quantity of absorbent material employed is by no means critical and depends upon the ratio of reactants, i.e., upon the relative wetness of the reaction product. For a cobalt carbonate to lactic acid reactant ratio of 1:6, about four parts by weight absorbent material, e.g., diatomaceous earth, has been found sufficient. As the proportion of lactic acid increases, the need for diatomaceous earth likewise increases.

From a nutritional standpoint, it has been found to be desirable to admix the dred or undried cobalt lactate with a sacchariferous substance such as glucose, dextrose, sucrose, cane sugar, corn sugar, corn syrup, blackstrap molasses, molasses, starchy materials convertible to sugar (such as may be derived from wheat, corn or the like), and mixtures thereof. The sacchariferous substance may be liquid or solid (granulated) depending upon whether a dry or liquid supplement is desired. For liquid feeds, when the absorbent material is omitted, the use of a liquid sacchariferous substance makes the supplement completely water-soluble. Since the sacchariferous additive is considered a nutrient and contributes to the energy value of the feed, as well as functioning as a detoxifying agent within the rumen, it will be apreciated that the amount to this substance admixed with the lactate is a matter of choice dependent upon the quantity of sugar value the feed is to contain. In addition, the supplement may contain natural and/or artificial flavoring. Finally, the cobalt lactate-absorbent material-sacchariferous substance admixture may be diluted or extended with an edible, solid (granulated) carrier, such as wheat flour or other cereal grain flour or product, to produce a final feed supplement having the desired concentration of polarized cobalt.

After the supplement has been admixed to include the desired ingredients in the desired proportions, it is preferred, although not necessary, to pass the supplement through a polarizing magnetic field to insure polarization of the cobalt. It is believed that the original polarization of the cobalt is unaffected by the reaction heat generated in forming the lactate. However, to assure that the initial polarization is not in any way diminished by subsequent processing, the final polarizing step is recommended. If the supplement is in granular form, it may be passed through an auger about which a magnetic field has been established. On the other hand, if the supplement is in liquid form, the magnetic field may be established around a flow tube through which the supplement is made to pass.

To demonstrate the surprising effectiveness of polarized cobalt in promoting ruminant growth, a feed was prepared and fed to cattle on a controlled comparative basis with one group of cattle receiving the feed supplemented with non-polarized cobalt and a second group of cattle receiving the feed supplemented polarized cobalt. Exemplary results are set forth in the following Examples.

EXAMPLE I

Polarized cobalt was prepared as follows: a polarizing magnetic field was established around a 3¼ inch diameter stainless steel tube by wrapping the tube with 4.27 pounds of No. 27 H.A.T.D. wire which draws 0.33 amps. at about 110 volts D.C. until a 2272 amp. turns coil was in place. A 110 volt A.C. source was rectified to 110 volts D.C. and passed through the coil to establish a polarizing magnetic field around the tube. Twelve pounds of cobalt carbonate (containing 46% cobalt by weight) was then passed through the magnetic field within the tube whereupon the cobalt electrons were energized, excited and polarized.

EXAMPLE II

Thirty six pounds of polarized cobalt carbonate prepared as in Example I were slowly added to 216 pounds of 88% lactic acid in a stainless steel vat with constant agitation of the reaction mixture. Additions were metered to control the temperature in the vat to the range 80°–95° F. When the reaction had stopped, 148 pounds of diatomaceous earth commercially available under the name "Aquafil K-8" was admixed with the reaction product to absorb excess lactic acid and any residual moisture. The diatomaceous earth formed a 10% water slurry having a pH of 7.6 and had the following approximate chemical analysis: silica 87.54%; aluminum 4.14%; iron .81%; trace amounts of $TiO_2$, MnO, MgO, CaO, $Na_2O$, $K_2O$, chloride and sulfite; balance $H_2O$. To the resulting admixture was added 400 pounds of granulated dextrose.

The polarized cobalt lactate-diatomaceous earth-dextrose supplement was next augered through a tube having a magnetic field established about it in the same manner as set forth in Example I to assure complete polarization of all the cobalt in the supplement. Finally, the supplement was extended to one ton by the addition of about 1200 pounds of red dog wheat flour.

EXAMPLE III

A conventional cattle feed ration was prepared which included at least the requisite amounts of the trace elements usually considered necessary for proper nutrition. The cattle were divided into two groups—a test group which was fed the feed ration plus ½ ounce per day head of the supplement of Example II containing polarized cobalt—and a control group which was fed the same feed ration plus an equivalent amount of non-polarized cobalt.

TEST 1

This test was conducted on feeder cattle which has been sold to a feed lot for final feeding prior to slaughter. Table I shows data at the start of the feed period ("IN") and 131 days later at the end of the feed period ("Out"):

TABLE I

|  | Test | Control |
|---|---|---|
| Number of cattle in each group | 186 | 170 |
| Average "In" weight per animal | 821 lbs. | 826 lbs. |
| Average "Out" weight per animal | 1151 lbs. | 1106 lbs. |
| Total average gain per animal | 330 lbs. | 280 lbs. |
| Days of feed | 131 | 131 |
| Average daily gain per animal | 2.52 lbs. | 2.14 lbs. |
| Pounds feed per pound weight gain | 9.68 | 10.73 |

It is apparent from Table I that the cattle fed the polarized cobalt-containing ration gained appreciably more weight in the same period of time on the same quantity of feed ration as the cattle fed the non-polarized cobalt ration. Moreover, the amount of feed necessary to achieve 1 pound gain per animal was considerably less with the test group than with the control group. Thus, the test demonstrates that the polarized cobalt enabled the ruminant to more efficiently utilize the feed and convert it to weight.

Test 2

This test was conducted on calves at weaning weights of about 400–550 pounds each which were on a growing ration until they were large enough to be sold as feeder cattle (see Test 1). Table II shows data at the start of the feed period ("in") and 83 days later at the end of the feed period ("Out"):

TABLE II

|  | Test | Control |
|---|---|---|
| Number of cattle in each group | 59 | 64 |
| Average "In" weight per animal | 406 lbs. | 416 lbs. |
| Average "Out" weight per animal | 610 lbs. | 608 lbs. |
| Total average gain per animal | 204 lbs. | 192 lbs. |
| Days on feed | 83 | 83 |
| Average daily gain per animal | 2.45 lbs. | 2.31 lbs. |

Test 2 confirms the result of Test 1 that cattle fed the polarized cobalt-containing feed more efficiently utilized the feed ration to increase weight.

The quantity of cobalt in ½ ounce of supplement per head per day constitutes a nutritionally significant amount of cobalt, yet is below the maximum permissible level for ruminant feeding. It will be appreciated that the nutritionally significant cobalt level, or minimal requirement, varies for each animal. Based on ppm cobalt in air-dry feed, the minimum daily cobalt levels for exemplary animals are: beef cattle — 0.1 ppm; dairy cattle — 0.1 ppm; horses — 0.05 ppm; dogs — 2.5 ppm. However, animals can safely consume far more than their minimum requirement, e.g. recommended cobalt levels for cattle vary from a minimum of 0.1 ppm daily to a maximum of 10 ppm. It is believed that ½ ounce per day head of the supplement of Example II, or equivalent quantities of polarized cobalt in other supplement compositions, represents about the maximum level of polarized cobalt which is economical. Greater quantities of polarized cobalt are wasteful since they do not appear to contribute to further growth promotion, i.e., the ruminant does not appear to be able to utilize the additional polarized cobalt. On the other hand, lesser quantities of polarized cobalt, while useful in promoting growth, do not accomplish maximum attainable growth. Inasmuch as the polarized cobalt supplement is relatively inexpensive, there appears to be no reason to use it in less than the maximum effective amounts.

While the present invention has been described with reference to particular embodiments thereof, it will be understood by those skilled in the art that numerous modifications can be made without departing from the scope of the invention. Accordingly, all modifications and equivalents may be resorted to which fall within the scope of the invention as claimed.

What is claimed as new is as follows:

1. An animal feed supplement comprising an animal feedstuff selected from the group consisting of solid and liquid sacchariferous substances and containing cobalt in polarized form.

2. An animal feed supplement, as claimed in claim 1, wherein said cobalt is present as a cobalt compound selected from the group consisting of cobalt carbonate, cobalt lactate, cobalt sulfate, cobalt oxide and cobalt hydroxide.

3. An animal feed supplement, as claimed in claim 2, wherein said cobalt is present as cobalt lactate.

4. An animal feed supplement, as claimed in claim 2, further including an absorbent material.

5. An animal feed supplement, as claimed in claim 4, wherein said absorbent material is a diatomaceous earth.

6. An animal feed substance, as claimed in claim 1, wherein said sacchariferous substance is selected from the group consisting of sucrose, dextrose, glucose, molasses, and mixtures thereof.

7. A method of making a cobalt containing animal feed supplement comprising the steps of polarizing said cobalt by passing it through a magnetic field and admixing said cobalt with an animal feedstuff selected from the group consisting of solid and liquid sacchariferous substances.

8. A method, as claimed in claim 7, wherein said supplement comprises a plurality of admixed ingredients and said cobalt is polarized prior to admixing it with said other ingredients.

9. A method, as claimed in claim 7, wherein said supplement comprises a plurality of admixed ingredients and said cobalt is polarized after admixture with said other ingredients.

10. A method, as claimed in claim 8, further including the step of passing said polarized cobalt containing feed supplement through a magnetic field.

11. A method, as claimed in claim 7, wherein the strength of said magnetic field is at least about 2270 amp. turns.

12. A method for making an animal feed supplement comprising the steps of:
  a. passing a cobalt containing compound through a magnetic field to polarize said cobalt;
  b. reacting said compound with lactic acid; and
  c. admixing the reaction product of said compound with lactic acid with an animal feedstuff selection from the group consisting of solid and liquid feedstuffs.

13. A method, a claimed in claim 12, wherein the reaction product is dried by admixing an adsorbent material therewith.

14. A method, as claimed in claim 13, wherein said absorbent material is a diatomaceous earth.

15. A method, as claimed in claim 12, wherein the reaction product is admixed with a liquid sacchariferous substance selected from the group consisting of dextrose, glucose, sucrose, molasses, and mixtures thereof.

16. A method, as claimed in claim 13, wherein said admixture is further admixed with a sacchariferous substance selected from the group consisting of dextrose, glucose, sucrose, molasses, and mixtures thereof.

17. A method, as claimed in claim 12, wherein one part of said compound is reacted with from 4 to 8 parts lactic acid.

18. A method, as claimed in claim 17, wherein one part of said compound is reacted with about 6 parts lactic acid.

19. A method, as claimed in claim 17, wherein said reaction is accomplished at a temperature in the range 75°–98° F.

20. A method, as claimed in claim 19, wherein said reaction is accomplished at a temperature in the range 80°–95° F.

21. A method, as claimed in claim 19, wherein said reaction product is admixed with a diatomaceous earth and a sacchariferous substance selected from the group consisting of dextrose, glucose, sucrose, molasses, and mixtures thereof.

22. A method, as claimed in claim 19, wherein said reaction product is admixed with a liquid sacchariferous substance selected from the group consisting of dextrose, glucose, sucrose, molasses, and mixtures thereof.

23. A method, as claimed in claim 21, wherein about 36 pounds per ton supplement of said compound is reacted with about 216 pounds lactic acid per ton supplement, the reaction product is admixed with about 148 pounds diatomaceous earth per ton supplement and about 400 pounds of a granulated sacchariferous substance selected from the group consisting of dextrose, glucose, sucrose, molasses, and mixtures thereof per ton supplement, and further including sufficient edible extender to form one ton of feed supplement.

24. A method of promoting the growth of ruminant animals comprising feeding said animals a ration including a nutritionally significant quantity of cobalt in polarized form.

25. A method, as claimed in claim 24, wherein said cobalt is cobalt lactate.

26. A method, as claimed in claim 24, wherein said polarized cobalt is included in said ration as a feed supplement, said supplement further including a diatomaceous earth and a sacchariferous substance, said sacchariferous substance selected from the group consisting of dextrose, glucose, sucrose, molasses, and mixtures thereof.

27. A method, as claimed in claim 26, wherein said supplement further includes an edible extender.

28. A method, as claimed in claim 24, wherein said polarized cobalt is included in said ration as a feed supplement, said supplement consisting essentially of the reaction product of one part polarized cobalt carbonate and 4 to 8 parts lactic acid at a temperature of 75°–98° F. admixed with a diatomaceous earth and a sacchariferous substance selected from the group consisting of dextrose, glucose, sucrose, molasses, and mixtures thereof.

29. A method, as claimed in claim 28, wherein said supplement consists essentially of the reaction product of 36 pounds calcium carbonate per ton supplement with about 216 pounds lactic acid per ton supplement, and further including in admixture with said reaction product, about 148 pounds diatomaceous earth per ton supplement, about 400 pounds of said sacchariferous substance per ton supplement, and sufficient edible extender to form one ton of supplement.

30. A method, as claimed in claim 29, wherein said supplement is fed to said ruminants at the rate of one-half ounce per head per day.

31. An animal feed supplement comprising the reaction product of a cobalt compound and lactic acid in the temperature range 75°–98° F., the cobalt in said reaction product being in polarized form.

32. An animal feed supplement, as claimed in claim 31, wherein said supplement includes a sacchariferous substance selected from the group consisting of sucrose, dextrose, glucose, molasses, and mixtures thereof.

33. An animal feed supplement, as claimed in claim 32, wherein said cobalt compound is cobalt carbonate.

* * * * *